US005148325A

United States Patent [19]

Wang

[11] Patent Number: 5,148,325

[45] Date of Patent: Sep. 15, 1992

[54] VEHICULAR EXTERNAL MIRROR ASSEMBLY

[76] Inventor: Min-Chih Wang, No. 35, Kuo-Min-Hsin Ts'un, Feng-Yuan City, Taichung Hsien, Taiwan

[21] Appl. No.: 805,530

[22] Filed: Dec. 11, 1991

[51] Int. Cl.[5] .............................................. G02B 7/18

[52] U.S. Cl. .................................. 359/841; 359/843; 359/872; 359/877; 359/881

[58] Field of Search ............... 359/841, 843, 844, 871, 359/872, 873, 877, 881

[56] References Cited

U.S. PATENT DOCUMENTS 4,692,000 9/1987 Wada et al. ......................... 359/877
5,012,693 5/1991 Enomoto et al. ................... 359/841

*Primary Examiner*—Bruce Y. Arnold
*Assistant Examiner*—J. P. Ryan
*Attorney, Agent, or Firm*—Ostrolenk, Faber, Gerb & Soffen

[57] ABSTRACT

A vehicular external mirror assembly includes a casing having a mirror unit and a tubular member. A first tube has a twisted oblique elongated slot extending longitudinally between a first open top and a first open bottom end of the first tube. The tubular member is slidably sleeved onto the first tube. A threaded rotatable shaft is mounted in the first tube. An elevating unit includes an annular member threadably engaging the rotatable shaft. The annular member has a radial stud projecting through said elongated slot slidably to engage the same and being connected to the tabular member of the casing. An electrical driving unit connected to a lower end of the rotatable shaft includes a motor and a gear assembly interconnecting the lower end of the rotatable shaft and the motor.

5 Claims, 4 Drawing Sheets

130
131
13
131
12
10
14
41
40
42
360
363
361
36
300
362
362
361
20'
240
242
24
20
20a
241
23
21
20"
33
35
31
30
32
33

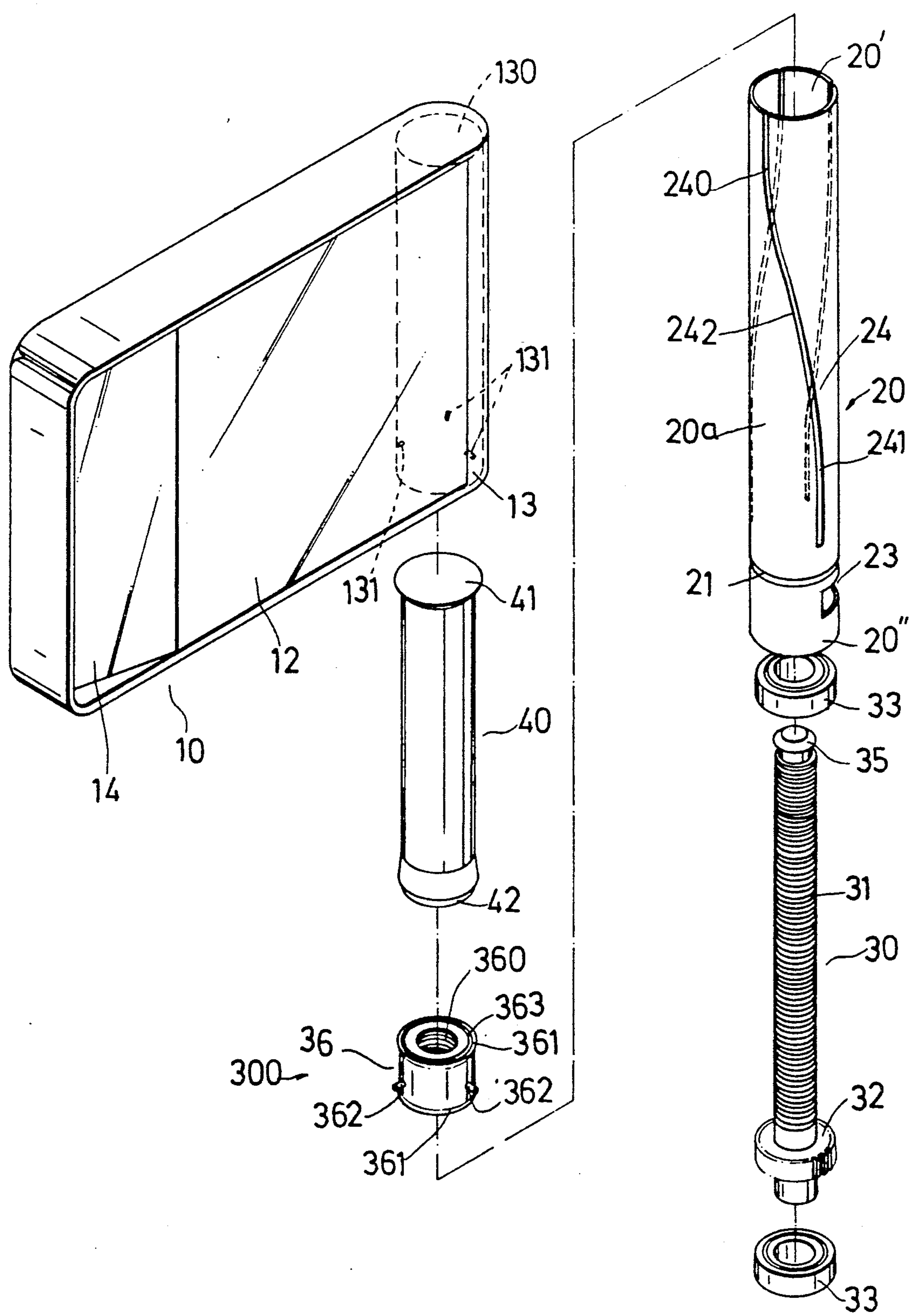
F I G. 1

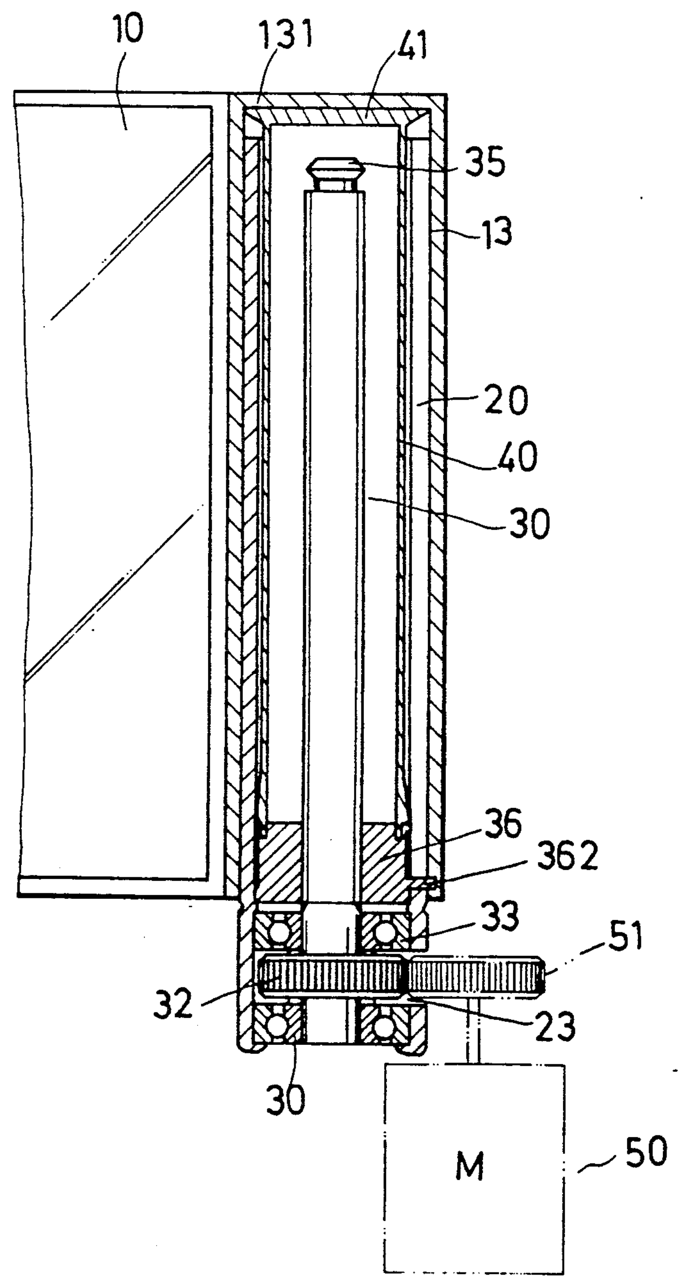
F I G. 2

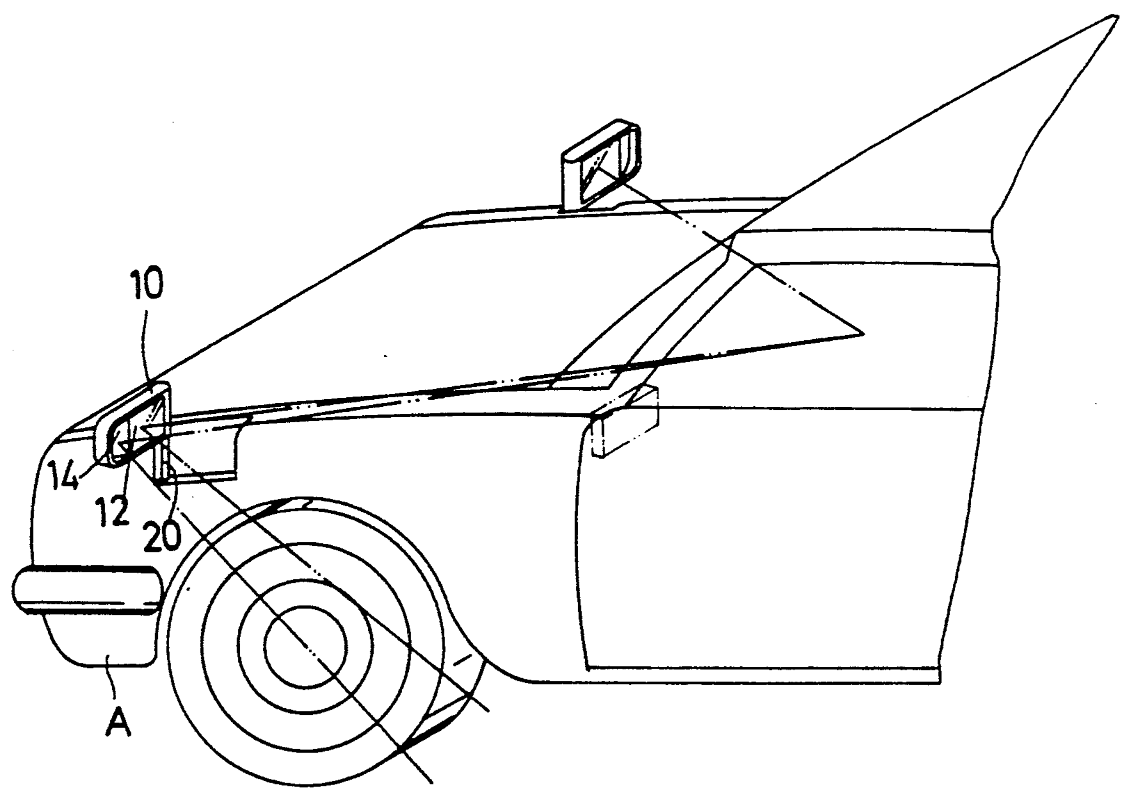
F I G. 4

VEHICULAR EXTERNAL MIRROR ASSEMBLY

BACKGROUND OF THE INVENTION

1. FIELD OF THE INVENTION

This invention relates to an external mirror, more particularly to a vehicular external mirror assembly having an electrically operated positioning device.

2. DESCRIPTION OF THE RELATED ART

A car is usually provided with an external mirror mounted adjacent to a front door thereof to give a view of an area behind the car. The rear view area provided by this external mirror for the driver is narrow, so the driver often looks left and right to get a wider rear view. This external mirror may be manually foldable. This external mirror runs the risk of damage when the driver forgets to fold it.

SUMMARY OF THE INVENTION

Therefore, the objective of this invention is to provide a vehicular external mirror assembly which has an electrically operated positioning device and is mounted adjacent to a front end of a vehicle to obtain a wider rear view area.

Accordingly, an external mirror assembly of a vehicle includes a casing which has a mirror unit mounted thereto and an upright tubular member provided therein extending along one side of the casing. The tubular member has a closed top end, an open bottom end and a cylindrical inner face.

The external mirror assembly further includes an upright first tube having a first open top end, a first open bottom end fixed to the vehicle and a first side wall. The first side wall has a twisted oblique elongated slot extending longitudinally between the first open top and bottom ends. The tubular member of the casing is slidably sleeved onto the first tube. A threaded rotatable shaft is mounted in the first tube and has an upper and a lower end.

An elevating unit for lifting and turning the casing is slidably mounted to the rotatable shaft and confined in the first tube. The elevating unit includes an annular member threadably engaging the rotatable shaft. The annular member has a radial stud projecting therefrom, extending through the elongated slot slidably to engage the same and being connected to the tubular member of the casing.

An electrical driving unit is connected to the lower end of the rotatable shaft to rotate the same. The electrical driving unit includes a motor and a gear assembly interconnecting the lower end of the rotatable shaft and the motor.

BRIEF DESCRIPTION OF THE DRAWINGS

Other features and advantages of the present invention will become apparent in the following detailed description of the preferred embodiments, with reference to the accompanying drawings, of which:

FIG. 1 is an exploded view of a preferred embodiment of the vehicular external mirror assembly of this invention.

FIG. 2 is a partially sectional view of the preferred embodiment.

FIG. 4 shows that the preferred embodiment is mounted to a vehicle.

DETAILED DESCRIPTION OF THE PREFERRED EMBODIMENTS

Figure 3:
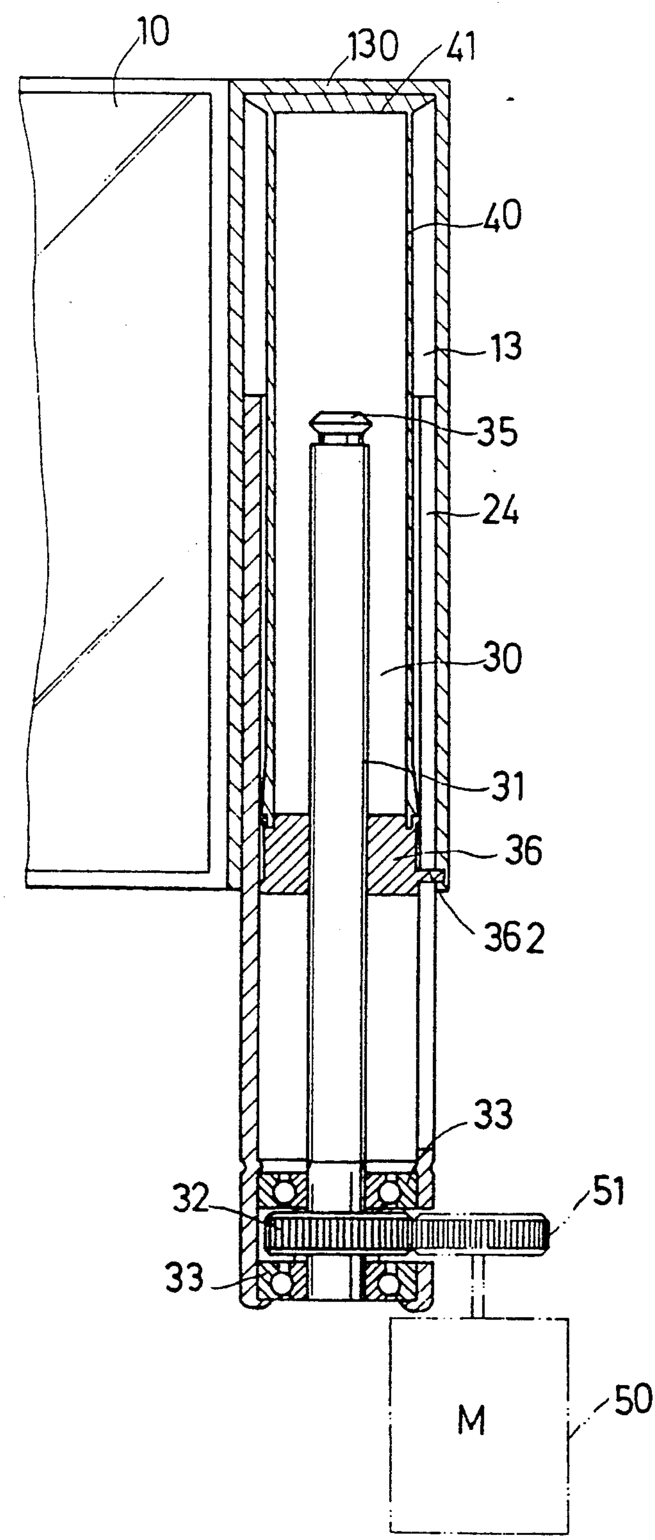
FIG. 3 is a partially sectional view of the preferred embodiment showing that the casing is lifted and turned.

Referring to FIGS. 1 to 4, a vehicular external mirror assembly of this invention for a vehicle (A) includes a casing (10). The casing (10) includes an upright tubular member (13) provided therein extending along one side of the casing (10), a first mirror (12) mounted thereto adjacent to the tubular member (13), and a second mirror (14) which is connected to the first mirror (12) away from the tubular member (13) and which bends outward and forward with respect to the vehicle (A) at a certain angle relative to the first mirror (12) so as to obtain a wider rear view area. The tubular member (13) has a closed top end (130), an open bottom end, and a cylindrical inner face having three holes (131) formed thereon adjacent to the open bottom end.

An upright first tube (20) has a first open top end (20'), a first open bottom end (20") to be fixed to the vehicle (A), and a first side wall (**20*a*) having a neck portion (21) adjacent to the first open bottom end (20"). The first side wall (20*a*) has an opening (23) below the neck portion (21) adjacent to the first open bottom end (20"), and three twisted oblique elongated slots (24) extending axially from the first open top end (20') toward the first open bottom end (20"). The elongated slots (24) are angularly spaced from one another. Each of the elongated slots (24) has two axial extending end sections (240, 241) and an intermediate twisted oblique elongated section (242) between the two axial extending end sections (240, 241). The tubular member (13) of the casing (10) is slidably sleeved onto the first tube (20**).

A threaded rotatable shaft (30) is mounted in the first tube (20) and has an upper end with a radial annular flange (35), a lower end and an intermediate threaded section (31). The lower end of the shaft (30) has a pair of bearings (33) mounted thereon and a gear (32) mounted between the bearings (33) aligned with the opening (23) of the first tube (20).

An electrical driving unit (50) for rotating the shaft (30) is mounted in the vehicle (A). The electrical driving unit (50) includes a motor (M) and a gear (51) engaged with the gear (32) through the opening (23).

An elevating unit (300) for lifting and turning the casing (10) is slidably mounted to the shaft (30) and is confined in the first tube (20). The elevating unit (300) includes an annular member (36) having internal screw threads threadably engaging the shaft (30). The annular member (36) has two radial flanges (361) respectively extending from a top and a bottom end thereof slidably to contact the inner surface of the first tube (20). The annular member (36) further has three angularly spaced radial studs (362) respectively projecting therefrom, extending through and moving along the elongated slots (24), and engaging the tubular member (13) at the holes (131). The annular member (36) has a peripheral groove (363) formed on its top face. The annular member (36) defines an opening (360) smaller than the outer diameter of the annular flange (35) of the shaft (30).

An upright second tube (40) is slidably inserted in the first tube (20). The second tube (40) has a closed top end (41) projecting through the first open top end (20') of the first tube (20) and connected to the closed top end (130) of the tubular member (13), and a bottom end having a downwardly extending annular flange (42)

received in the groove (363) of the annular member (36).

The first open bottom end (20″) of the first tube (20) and the electrical driving unit (50) are fixed to the vehicle (A) adjacent to the front end thereof. When the car ignition key is operated to start the vehicle (A), the electrical driving unit (50) is actuated to rotate the shaft (30) in one direction. The elevating unit (300) is raised up along the elongated slots (24), and the casing (10) is simultaneously raised up and turned outward. Since the opening (360) is smaller than the outer diameter of the annular flange (35), the annular member (36) is prevented from being raised up out of the shaft (30). When the car ignition key is operated to stop the vehicle (A), the electrical driving unit (50) is actuated to rotate the shaft (30) in the opposite direction, the elevating unit (300) is moved down and the casing (10) is simultaneously moved down and turned inward. In addition, the position of the casing (10) can be adjusted as desired. The axial extending end sections (240, 241) of the elongated slots (24) facilitate the initial movement of the elevating unit (300) when the car ignition key is operated.

It has been shown in the preceding paragraphs that the position of the casing (10) of the vehicular external mirror assembly of this invention is automatically adjusted according to the operational state of the vehicle (A). Thus, the casing (10) is in a safe position and faces no risk of damage when the vehicle (A) is not in use. The vehicular external mirror assembly is located adjacent to the front end of the vehicle (A), and its first and second mirrors (12, 14) are mounted with a predetermined angle therebetween so as to obtain a wider rear view area.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. an external mirror assembly of a vehicle comprising a casing having a mirror unit mounted thereto and an upright tubular member provided therein and extending along one side of said casing, said tubular member having a closed top end, an open bottom end and a cylindrical inner face; characterized by said external mirror assembly further comprising:

an upright first tube having a first open top end, a first open bottom end fixed to said vehicle and a first side wall, said first side wall having a twisted oblique elongated slot extending longitudinally between said first open top and bottom ends; said tubular member of said casing being slidably sleeved onto said first tube;

a threaded rotatable shaft mounted in said first tube and having an upper and a lower end;

an elevating unit for lifting and turning said casing slidably mounted to said rotatable shaft and confined in said first tube, said elevating unit including an annular member threadably engaging said rotatable shaft, said annular member having a radial stud projecting therefrom, extending through said elongated slot slidably to engage the same and being connected to said tubular member of said casing; and an electrical driving unit connected to said lower end of said rotatable shaft to rotate said rotatable shaft, said electrical driving unit including a motor and a gear assembly interconnecting said lower end of said rotatable shaft and said motor.

2. An external mirror assembly as claimed in Claim 1, characterized in that said tubular member of said casing has a hole formed on said inner face thereof adjacent to said open bottom end thereof, said radial stud of said elevating unit engaging said hole.

3. An external mirror assembly as claimed in Claim 1, characterized in that said external mirror assembly further comprises an upright second tube having a second closed top end and a second bottom end, said second tube being slidably inserted in said first tube said second closed top end projecting through said first open top end and being connected to said closed top end of said tubular member of said casing, said second bottom end resting on said annular member of said elevating unit.

4. An external mirror assembly as claimed in Claim 1, characterized in that said mirror unit includes a first mirror adjacent to said tubular member of said casing and a second mirror which is connected to said first mirror away from said tubular member and which bends outward and forward with respect to said vehicle at a certain angle relative to said first mirror so as to obtain a wider rear view area.

5. An external mirror assembly as claimed in Claim 1, characterized in that said twisted oblique elongated slot includes two axial extending end sections and an intermediate twisted oblique elongated section between said two axial extending end sections.

* * * * *